United States Patent
Fries et al.

(10) Patent No.: US 9,235,204 B2
(45) Date of Patent: Jan. 12, 2016

(54) METHOD FOR ESTABLISHING A SECURE CONNECTION FROM A SERVICE TECHNICIAN TO A COMPONENT OF AN AUTOMATION ENVIRONMENT THAT CAN BE REMOTELY DIAGNOSED AND/OR MAINTAINED AND IS EXPERIENCING FAILURE

(75) Inventors: Steffen Fries, Baldham (DE); Andreas Köpf, München (DE)

(73) Assignee: Siemens Aktiengesellschaft, Munich (DE)

( * ) Notice: Subject to any disclaimer, the term of this patent is extended or adjusted under 35 U.S.C. 154(b) by 1148 days.

(21) Appl. No.: 12/680,220

(22) PCT Filed: Aug. 28, 2008

(86) PCT No.: PCT/EP2008/061286
§ 371 (c)(1),
(2), (4) Date: Mar. 26, 2010

(87) PCT Pub. No.: WO2009/043646
PCT Pub. Date: Apr. 9, 2009

(65) Prior Publication Data
US 2010/0313259 A1    Dec. 9, 2010

(30) Foreign Application Priority Data
Sep. 26, 2007   (DE) .......................... 10 2007 046 079

(51) Int. Cl.
G05B 19/042    (2006.01)
G05B 23/02    (2006.01)
H04L 9/32    (2006.01)

(52) U.S. Cl.
CPC .......... *G05B 19/042* (2013.01); *G05B 23/0216* (2013.01); *H04L 9/3228* (2013.01); *H04L 9/3263* (2013.01); *G05B 2219/24154* (2013.01); *G05B 2219/24172* (2013.01)

(58) Field of Classification Search
CPC ..... H04L 9/326; H04L 9/0827; H04L 9/3215; H04L 63/0807; H04L 63/0823; H04L 63/18; H04L 9/3228
USPC .......................................................... 726/10
See application file for complete search history.

(56) References Cited

U.S. PATENT DOCUMENTS 7,233,830 B1 *   6/2007   Callaghan et al. ................ 700/9
7,861,077 B1 *   12/2010   Gallagher, III ............... 713/155

(Continued)

FOREIGN PATENT DOCUMENTS

| DE | 10 144 971 | 3/2003 |
|---|---|---|
| DE | 10 200 681 | 7/2003 |

(Continued)

*Primary Examiner* — Tamara T Kyle
(74) *Attorney, Agent, or Firm* — Cozen O'Connor

(57) ABSTRACT

A method for establishing a secure connection from a service technician to a component of an automation environment that can be remotely diagnosed and/or maintained and is experiencing failure. A service certificate is required for establishing the secure connection, wherein a secure initial connection is first established to the automation environment by the service technician using a one-time password. With the initial connection, a service certificate required for establishing the secure connection to the component of the automation environment experiencing the failure is subsequently transmitted from the automation environment to the service technician. The secure connection from the service technician to the component experiencing the failure is then established by means of the service certificate. The invention further relates to an automation environment that is suitable for carrying out a method of said kind.

26 Claims, 2 Drawing Sheets

(56) References Cited

U.S. PATENT DOCUMENTS

| | | |
|---|---|---|
| 8,127,346 B2 * | 2/2012 | Kulakowski et al. ............ 726/10 |
| 2004/0107345 A1 * | 6/2004 | Brandt et al. ................. 713/171 |
| 2005/0015624 A1 * | 1/2005 | Ginter et al. .................. 713/201 |
| 2005/0033886 A1 | 2/2005 | Grittke et al. |
| 2005/0175031 A1 * | 8/2005 | Harley, Jr. ..................... 370/466 |
| 2005/0251685 A1 | 11/2005 | Oelsner |
| 2005/0262552 A1 * | 11/2005 | Brown et al. ................... 726/10 |
| 2006/0031171 A1 * | 2/2006 | Talanis et al. ................... 705/59 |
| 2006/0095231 A1 | 5/2006 | Okazaki et al. |
| 2007/0006291 A1 * | 1/2007 | Barari et al. .................... 726/10 |
| 2009/0083843 A1 * | 3/2009 | Wilkinson et al. ................ 726/9 |

FOREIGN PATENT DOCUMENTS

| | | |
|---|---|---|
| DE | 10 2005 015 919 | 10/2005 |
| DE | 10 2005 015 792 | 12/2005 |
| EP | 1 582 950 | 10/2005 |

\* cited by examiner

METHOD FOR ESTABLISHING A SECURE CONNECTION FROM A SERVICE TECHNICIAN TO A COMPONENT OF AN AUTOMATION ENVIRONMENT THAT CAN BE REMOTELY DIAGNOSED AND/OR MAINTAINED AND IS EXPERIENCING FAILURE

CROSS-REFERENCE TO RELATED APPLICATIONS

This is a U.S. national stage of International Application No. PCT/EP2008/061286, filed on 28 Aug. 2008. Priority is claimed on German Application No. 10 2007 046 079.3, filed on 26 Sep. 2007.

BACKGROUND OF THE INVENTION

It is often the case, particularly in automation environments, that installations are performed by a plurality of different contractors or companies or, alternatively, that the individual components are sourced from different companies. For example, a first company supplies automation terminals, a second company network components, and a third company office components and equipment.

In order to enable service technicians to access automation terminals, use is generally made of an access credential, such as a service certificate with corresponding private key or a user ID with associated password or similar identifying information. However, an access mechanism of this kind must first be installed or configured on a computer, such as a laptop of the service technician. In order to avoid long downtimes, which are costly and therefore critical particularly in the automation environment, it must be possible to set up such accesses as quickly as possible.

It becomes problematic when, as described previously, a plurality of companies work in cooperation and different entities are involved in a fault or service situation that is summed up by the term "failure". Thus, it is possible, for example, for a service technician to seek access to automation terminals from a distance by remote access, but in order to do so must first connect to the network through, for example, a virtual private network (VPN) tunnel. If the service technician has not yet received a service certificate, which can certainly happen in the case of a relatively large pool of service technicians who are often responsible for supporting a plurality of companies, there is also a requirement for the service technician belonging to that company from which the network components are sourced.

It is therefore problematic to transmit a service certificate generated in this way to the service technician. Often the service technicians of the individual companies are separated from one another geographically, because it is known that most issues can be resolved by remote access. A plaintext transmission of the service certificate over the Internet is not advisable for security reasons. For a transmission by encrypted email, there is already a requirement for a shared public key infrastructure (PKI), which in turn is often too costly and complicated.

In order to circumvent these problems, to some extent it is necessary in the prior art techniques either for the service technicians to have all the service certificates of all the companies that are to be supported installed on their computers, or else to generate a service certificate on a "just in time" basis and to pass the generated service certificate to the appropriate service technician, such as by a data medium, or a Universal Serial Bus (USB) memory stick for example.

SUMMARY OF THE INVENTION

It is therefore an object of the invention to provide a method which enables fast and simple establishment of a secure connection from a service technician to a component experiencing a failure in an automation environment that can be diagnosed and/or maintained remotely.

This and other objects and advantages are achieved in accordance with the invention by a method for establishing a secure connection from a service technician to a component experiencing a failure in an automation environment which can be diagnosed and/or maintained remotely and in which a service certificate is required for establishing the secure connection, where a secure initial connection is provided from the service technician to the automation environment which is set up first by use of a one-time password, by which secure initial connection a service certificate required for establishing the secure connection to the component experiencing the failure in the automation environment is then transmitted from the automation environment to the service technician, and the secure connection from the service technician to the component experiencing the failure is finally established by the service certificate.

Advantages of the invention over the prior art are produced in particular as a result of the fact that in a failure scenario a service technician can be allowed remote access very quickly and securely through the use of a one-time password, for example, in the form of an initial credential such as a random number.

Furthermore, the method of the invention is easy to integrate into existing automation environments, because all that is necessary for this purpose is to upgrade network components with an additional logic element, such as a random number generator, or simply to install an additional authentication component in the network.

In an advantageous embodiment of the invention, in the event of a failure occurring, a service technician responsible for a component experiencing a failure receives by a first communication path and/or by means of a first message a trouble ticket which contains at least an indication pointing to the affected component of the automation environment. The one-time password is delivered or, as the case may be, transmitted over a second communication path and/or by a second message that is independent of the first message. By splitting the communication paths, such as by the IP address being communicated in a trouble ticket and the one-time password or initial credential being transmitted by SMS, it becomes more difficult for a potential attacker to obtain the relevant data for an access.

In another advantageous embodiment of the invention, the secure initial connection is at least a connection authenticated on the server side, by which connection the service technician authenticates himself using the one-time password.

In an additional advantageous embodiment of the invention, the one-time password is transmitted to the service technician responsible for the component experiencing the failure by a Short Message Service (SMS). Sending the password by SMS enables fast, targeted delivery of the password to the service technician responsible.

In a further advantageous embodiment of the invention, the one-time password is generated automatically by a system or device issuing the trouble ticket and transmitted by an SMS server to the service technician responsible for the component experiencing the failure.

In a particularly advantageous embodiment of the invention, a user interface is used, which permits an initial credential to be generated "by click" and subsequently to be sent by SMS for the purpose of generating the one-time password.

In another particularly advantageous embodiment of the invention, in order to access a component experiencing a failure, such as an automation terminal, in the automation environment, a service technician responsible for a component experiencing a failure connects to a network component of the automation environment by means of the initial connection, by which network component he then receives the secure connection to the component experiencing the failure.

In an additional particularly advantageous embodiment of the invention, at least the setting-up of the initial connection by the one-time password, such as an initial credential, is monitored by a service technician responsible for the network component. Here, it is conceivable to perform the monitoring "remotely", such as by telemonitoring.

In a further particularly advantageous embodiment of the invention, for security reasons, the generation of a one-time password is initiated by the service technician responsible for the network component, and subsequently the service technician responsible for the network component initiates a transmission of the one-time password to the service technician responsible for the component experiencing a failure, such as an automation terminal.

Preferably, the one-time password is an initial credential.

The initial credential can preferably be present in the form of a random number or can be generated based on a random number.

The initial credential preferably consists only of a random number with no correlation to further data relating to the automation environment and/or to the component experiencing a failure, such as an Internet Protocol (IP) address, a computer name or an account. The service technician responsible for the component experiencing a failure receives this data or a part of this data separately from the initial credential, preferably as a trouble ticket.

In an advantageous embodiment of the invention, the current random number or current initial credential for the access by the service technician to the component experiencing the failure is transported to the service technician responsible for the network component as an additional element in status messages in order, for example, to provide information on the use of an already issued random number or an already issued initial credential.

In yet another advantageous embodiment of the invention, the network component has a pool of random numbers that are output for service technicians.

In a particularly advantageous embodiment of the invention, after each completed access to specific components, the pool is refilled autonomously. In this way, it can be ensured for example that random numbers or initial credentials are generated by the network component at times at which the load on the network component is low. Alternatively, it is conceivable that an administrator of the component generating the random numbers is notified before the pool runs out to initiate the generation of a new pool. This would be comparable with a list of iTANs, as used at the present time in the banking environment.

In an additional advantageous embodiment of the invention, the random number that was used for the initial credential for the initial connection is integrated as additional information into the service certificate, such as in the subject alternative name (SAN), which can facilitate the subsequent analysis of log files in relation to the network access, because the certificates can easily be associated with a connection setup request by the association with the random number.

In a further advantageous embodiment of the invention, after establishment of the secure initial connection, the network component, for example, automatically makes available a service certificate which enables the connection to the automation terminal, for example.

In a particularly advantageous embodiment of the invention, the service certificate is a short-term certificate which is valid only for a predetermined time period, such as one hour or one day.

In yet another particularly advantageous embodiment of the invention, the generation of the one-time password and/or a remote access over the secure connection established by the service certificate is monitored and/or logged.

In accordance with yet a further particularly advantageous embodiment of the invention, the above-described embodiments of the method are performed by an automation environment which can be diagnosed and/or maintained remotely and which for this purpose has means for performing the disclosed embodiments of the method.

Here, the means preferably comprise at least one network component, such as a switch, a VPN box or a WLAN switch, which is equipped with a random number generator that is provided for generating one-time passwords preferably in the form of initial credentials.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained below with reference to the drawings, in which.

DETAILED DESCRIPTION OF THE PREFERRED EMBODIMENTS

Figure 1:
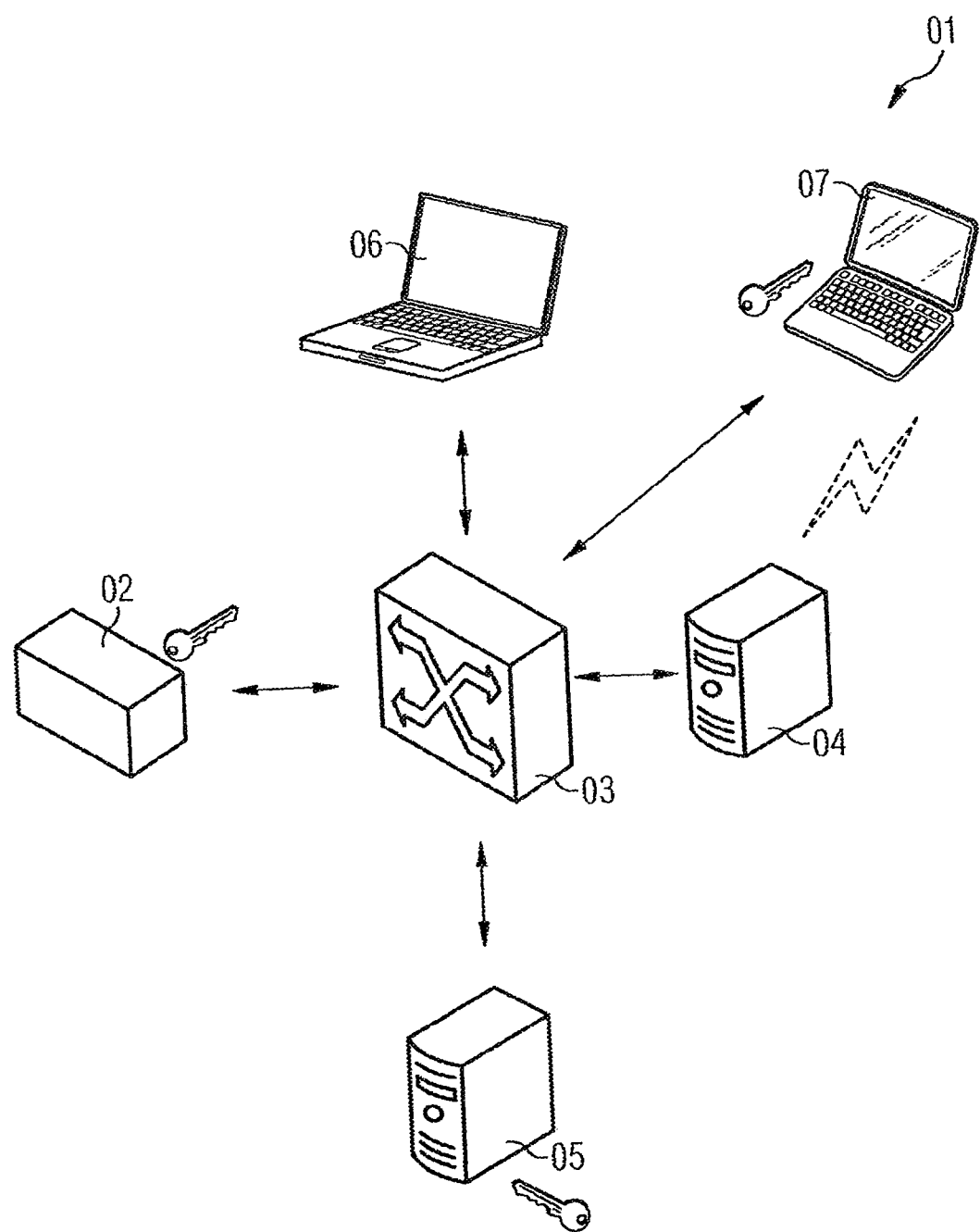
FIG. 1 shows a schematic representation of an automation environment which can be diagnosed and/or maintained by remote access.

With reference to FIG. 1, an automation environment 01 which can be diagnosed and/or maintained by remote access is structured as follows: An automation terminal 02, such as a machine tool 02, which can be configured and/or controlled, for example, by an office component or an office device (not shown), for example over a local area network, such as a corporate network, is connected to a network component 03 equipped with a random number generator. An SMS server 04 and a certification authority 05 are also connected to the network component 03 equipped with the random number generator. The network component 03 equipped with the random number generator, the SMS server 04 and the certification authority 05 can comprise constituent parts of a local area network. The network component 03 can comprise, for example, a switch, a VPN box or a WLAN switch. If necessary, such as in a failure situation, one or more service technicians 06, 07 responsible for the components 02, 03 experiencing the failure can connect remotely to the network component 03. In this example, the service technician 06 is responsible for the network component 03, and the service technician 07 for the automation terminal 02.

It is important to emphasize that the automation environment 01 can comprise a plurality of different automation terminals 02 for which different service technicians 07 can be responsible.

If a failure situation occurs in the automation terminal 02, the service technician 07 responsible for the automation terminal 02 receives a trouble ticket which contains an alert indicating a problem with the automation terminal 02. In order to be able to access the automation terminal 02, the service technician 07 must connect to the network component 03, by which he then obtains a connection to the automation terminal 02. However, the service technician 07 can only connect to the automation terminal 02 via the network component 03. In order to establish an initial connection to the network component 03, the service technician 07 requires an initial credential, preferably in the form of a random number, for authentication purposes. After the initial connection to the network component 03 is established, a service certificate is negotiated automatically, which then and only then enables the connection to the automation terminal 02.

The initial credential is either:

generated automatically by a system or device issuing the trouble ticket and sent over the SMS server 04 to the service technician 07 responsible for the automation terminal 02, the trusted administration of the service technician's telephone number being assumed as a prerequisite, or initiated by the service technician 06 responsible for the network component 03 and then sent by him to the service technician 07 responsible for the automation terminal 02.

In both cases, the generation of the initial credential or, as the case may be, the access by service certificate is monitored and logged.

In addition, the current random number or the current initial credential for access to the automation terminal 02 by the service technician 07 can be transported by status messages as an additional element in status messages to the service technician 06 responsible for the network component 03 in order, for example, to provide information about the use of an already issued random number or an already issued initial credential. Here, it is also necessary to implement the communication of the initial credentials in a confidential manner to preempt potential attacks. It is also conceivable that the network component 03 has a pool of random numbers which are output for the service technicians 06, 07. After each completed access to specific components 02, 03, this pool can be refilled autonomously.

In this way, an assurance is provided, for example, that random numbers or initial credentials will be generated by the network component 03 during times at which the load on the network component 03 is low.

The service certificate is preferably a short-term certificate which is valid, for example, for one day only. In addition the random number that was used for the initial credential for the initial connection can also be integrated as additional information into the service certificate, for example, in the subject alternative name, which can facilitate the subsequent analysis of log files in relation to the network access, because the certificates can easily be associated with a connection setup request via the association with the random number.

In sum, one or more network components, such as a switch, a VPN box or a WLAN switch, are equipped in accordance with the invention with a random number generator which thus generates one-time passwords in the form of initial credentials. The initial credentials can only be used for a first secure connection setup, i.e., an initial connection. Secure, in this context, means that the initial connection or, as the case may be, the channel by which the initial connection occurs, should be a connection authenticated at least on the server side, by which connection the service technician authenticates himself by a one-time password. A service certificate for establishing the connection to the component experiencing the failure in the automation environment is then transmitted over the secure initial connection.

For security reasons, the generation or transmission of the initial credential is preferably triggered by the service technician responsible for the network component. The initial credential is thereupon transmitted to the service technician responsible, for example, for the automation terminals by SMS. To that end, a user interface is preferably used which permits an initial credential to be generated "by click" and subsequently sent by SMS.

Since transmitting the initial credential by SMS can in fact also not be regarded as secure per se, the initial credential preferably consists only of a random number without any correlation with an Internet Protocol (IP) address, a computer name or an account. The service technician preferably receives this data or a part of this data in a trouble report or trouble ticket.

Splitting the communication paths, for example, by communicating the IP address in a trouble ticket and transmitting the initial credential by SMS, makes it more difficult for a potential attacker to obtain the relevant data for an access.

Moreover, it is not possible to totally rule out with one hundred percent certainty that all the required data will not be intercepted by an attacker. Consequently, at least the setting-up of the initial connection by means of the initial credential is preferably monitored by a service technician of the network component. Monitoring of this kind can also be performed "remotely" by telemonitoring.

Advantages of the invention over the prior art emerge in particular owing to the fact that by sending an initial credential, for example, a random number, by SMS it becomes possible for a service technician to be granted remote access very quickly and securely in a failure situation.

Moreover, the disclosed invention is also easy to integrate into existing automation environments, because for this purpose, the network components simply need to be upgraded with an additional logic element, such as a random number generator or an additional authentication component, must be installed in the network.

It is important to point out that the term "random number" within the meaning of the disclosed invention must not be understood exclusively as meaning one or more numbers, but may also refer to one or more letters or to a combination of one or more numbers and one or more letters. Thus, the random number can be, for example, a bit pattern or a bit string which represents both letters and numbers.

Figure 2:
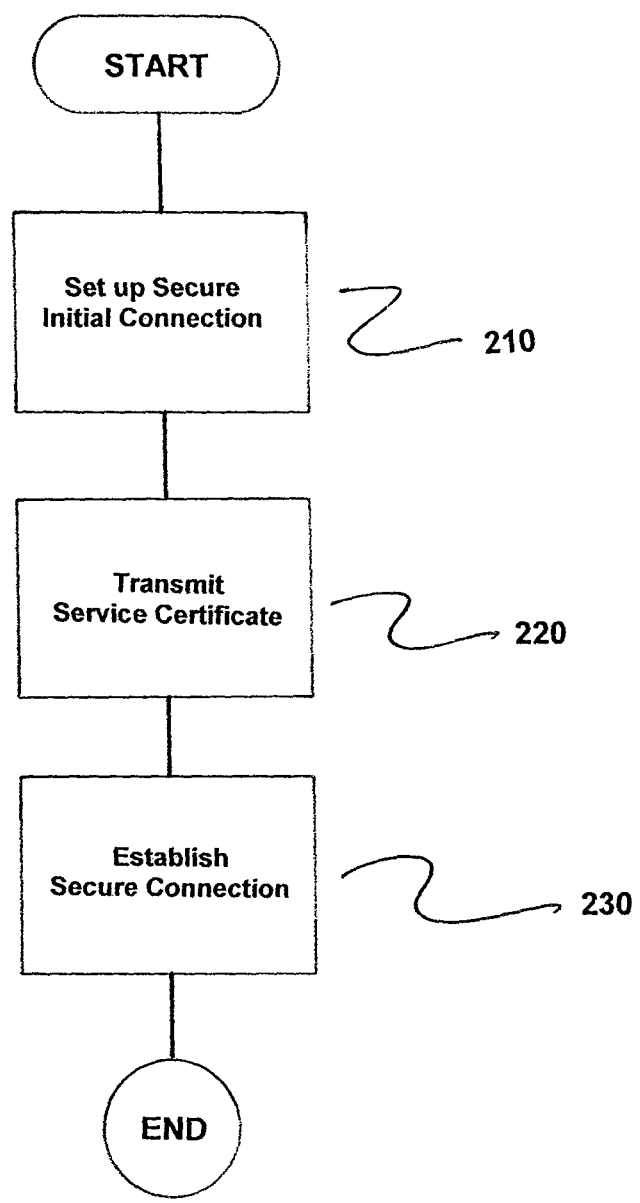
FIG. 2 is a flow chart illustrating the method in accordance with an embodiment of the invention.

FIG. 2 is a flow chart illustrating a method for establishing a secure connection from a service technician to a component experiencing a failure in an automation environment which is remotely at least one of diagnosable and maintainable, wherein a service certificate is required for establishing the secure connection. The method comprises setting up a secure initial connection from the service technician to the automation environment based on a one-time password, as indicated in step 210. The secure initial connection service certificate required for establishing the secure connection is transmitted from the automation environment to the service technician, as indicated in step 220. The secure connection from the service technician is then established to the component experiencing the failure using the service certificate, as indicated in step 230.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for establishing a secure connection from a service technician to a component experiencing a failure in an automation environment which is at least one of remotely diagnosable and remotely maintainable, wherein a service certificate is required for establishing the secure connection, the method comprising:
transmitting, when the failure in the automation environment occurs, a one-time password to a service technician responsible for the component experiencing the failure at least one of (i) over a separate communication path and (ii) by a first message;
setting up a secure initial connection from the service technician responsible for the component experiencing the failure to the automation environment based on the one-time password;
transmitting a service certificate required for establishing the secure connection from the automation environment to the service technician responsible for the component experiencing the failure via said secure initial connection; and
establishing the secure connection from the service technician to the component experiencing the failure using the service certificate.

2. The method as claimed in claim 1, wherein, when the failure in the automation environment occurs, the service technician responsible for the component experiencing the failure receives at least one of over a first communication path and by a second message a trouble ticket containing at least an indication of the affected component of the automation environment experiencing the failure.

3. The method as claimed in claim 1, wherein the secure initial connection comprises a connection authenticated at least on a server side, the secure initial connection permitting the service technician responsible for the component experiencing the failure to authenticate himself using the one-time password.

4. The method as claimed in claim 2, wherein the secure initial connection comprise a connection authenticated at least on a server side, the secure initial connection permitting the service technician responsible for the component experiencing the failure to authenticate himself using the one-time password.

5. The method as claimed in claim 1, wherein the one-time password is transmitted to the service technician responsible for the component experiencing the failure by a Short Message Service (SMS).

6. The method as claimed in claim 5, wherein the one-time password is generated automatically and transmitted by a Short Message Service (SMS) server to the service technician responsible for the component experiencing the failure.

7. The method as claimed in claim 1, wherein a user interface is used for generating the one-time password, the user interface permitting an initial credential to be generated "by click" and then sent by Short Message Service (SMS) to the service technician responsible for the component experiencing the failure.

8. The method as claimed in claim 1, wherein to access the component experiencing the failure in the automation environment, the service technician responsible for the component experiencing the failure connects to a network component of the automation environment through the secure initial connection; and
wherein the network component permits the service technician responsible for the component experiencing the failure to receive the secure connection to the component experiencing the failure.

9. The method as claimed in claim 8, further comprising: monitoring, by a service technician responsible for the network component, at least the setting-up of the initial connection.

10. The method as claimed in claim 9, wherein said monitoring by the service technician responsible for the network component is performed "remotely" by telemonitoring.

11. The method as claimed in claim 8, wherein generation of the one-time password is initiated by the service technician responsible for the network component; and
wherein the service technician responsible for the network component initiates a transmission of the one-time password to the service technician responsible for the component experiencing the failure.

12. The method as claimed in claim 1, wherein the one-time password comprises an initial credential.

13. The method as claimed in claim 12, wherein the initial credential comprises a random number or is generated based on the random number.

14. The method as claimed in claim 13, wherein the initial credential consists only of a random number having no correlation to at least one of further data relating to the automation environment and the component experiencing the failure.

15. The method as claimed in claim 14, wherein the service technician responsible for the component experiencing the failure receives the initial credential or a part of the initial credential.

16. The method as claimed in claim 12, wherein the service technician responsible for the component experiencing the failure receives the initial credential or a part of the initial credential.

17. The method as claimed in claim 13, wherein the random number for access by the service technician responsible for the component experiencing the failure to the component experiencing the failure is transported as additional information in status messages to the service technician responsible for the component experiencing the failure.

18. The method as claimed in claim 13, wherein the component experiencing the failure includes a pool of random numbers which are output for service technicians.

19. The method as claimed in claim 18, wherein after each completed access to specific components the random pool of numbers is refilled autonomously.

20. The method as claimed in claim 18, wherein an administrator of the component experiencing the failure generating the random numbers is notified before the random pool of numbers runs out to initiate generation of a new random pool of numbers.

21. The method as claimed in claim 13, wherein the random number is integrated as additional information into the service certificate.

22. The method as claimed in claim 1, wherein after the secure initial connection is set-up a service certificate is negotiated automatically.

23. The method as claimed in claim 1, wherein the service certificate comprises a short-term certificate.

24. The method as claimed in claim 1, wherein at least one of a generation of the one-time password and a remote access over the secure connection established by the service certificate is at least one of monitored and logged.

25. An automation environment which is at least one of remotely diagnosable and remotely maintainable, the automation environment comprising:

means for at least one of diagnosing and maintaining the automation environment including:

means for transmitting, when a failure in the automation environment occurs, a one-time password to a service technician responsible for a component experiencing a failure at least one of (i) over a separate communication path and (ii) by a message;

means for setting up a secure initial connection from the service technician to the automation environment based on the one-time password;

means for transmitting a service certificate required for establishing the secure connection from the automation environment to the service technician via said secure initial connection; and means for establishing the secure connection from the service technician to the component in the automation environment experiencing the failure using the service certificate.

26. The automation environment as claimed in claim 25, wherein the means for at least one of diagnosing and maintaining comprise at least one network component equipped with a random number generator configured for generating the one-time password.

\* \* \* \* \*